Figure 1:
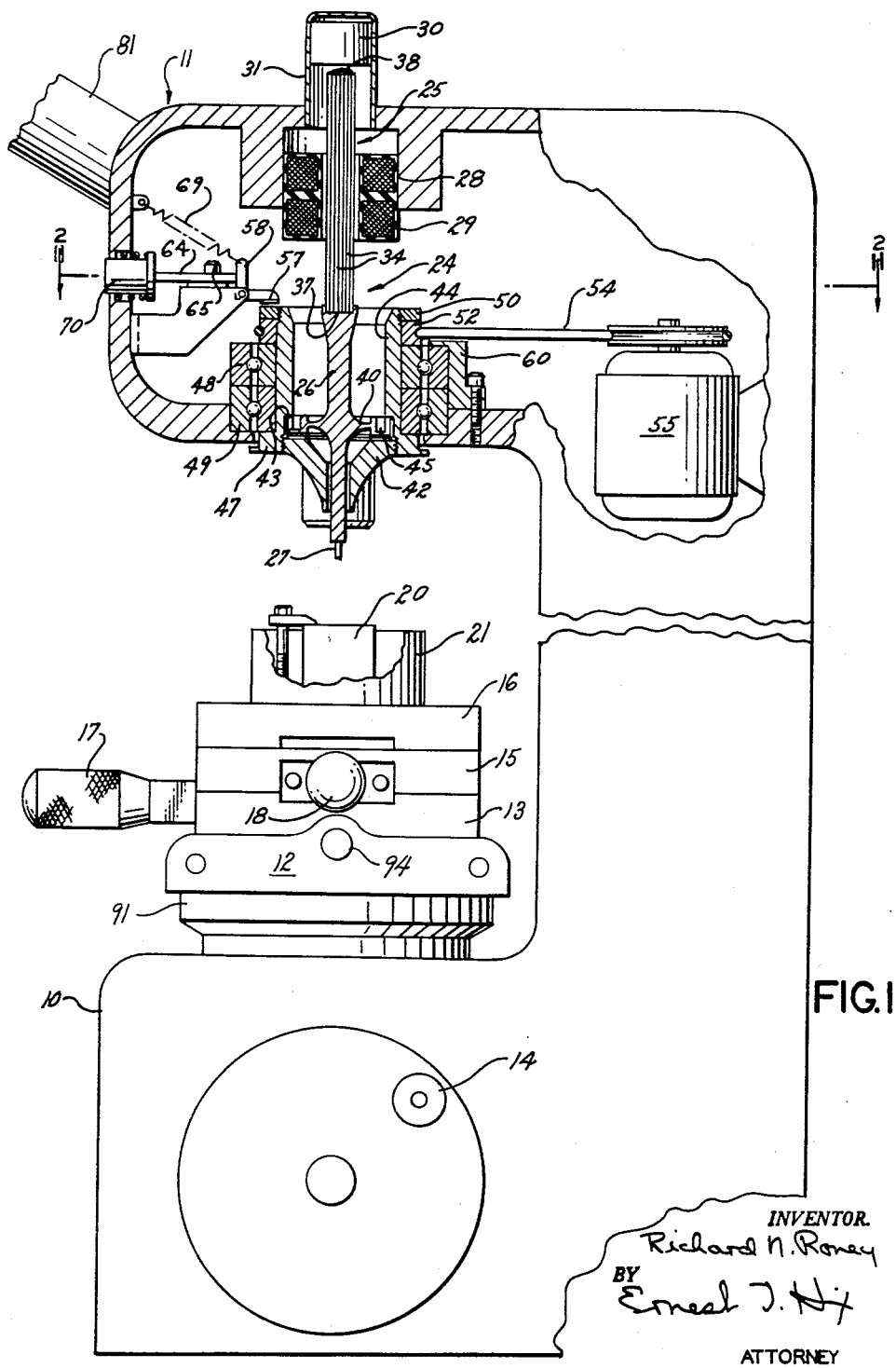

Jan. 9, 1962  R. N. RONEY  3,015,914
MACHINE TOOL
Filed June 19, 1959  3 Sheets-Sheet 1

INVENTOR.
Richard N. Roney
BY
Ernest J. Hix
ATTORNEY

Jan. 9, 1962  R. N. RONEY  3,015,914
MACHINE TOOL
Filed June 19, 1959  3 Sheets-Sheet 2

INVENTOR.
Richard N. Roney
BY
Ernest J. Hix
ATTORNEY

United States Patent Office 3,015,914
Patented Jan. 9, 1962

3,015,914
MACHINE TOOL
Richard N. Roney, Dayton, Ohio, assignor to The Sheffield Corporation, Dayton, Ohio, a corporation of Delaware
Filed June 19, 1959, Ser. No. 821,546
18 Claims. (Cl. 51—56)

This invention relates to machine tools and more particularly to an apparatus for machining through high frequency vibrations or oscillations of a forming tool.

This application is a continuation-in-part of application Serial No. 729,843, filed April 21, 1958, and now abandoned.

It is an object of this invention to provide such an apparatus for operation preferably in the range of ultrasonic frequencies having features for more accurate machining, more ready adjustment, and simpler, more economical construction than prior known devices of a similar character.

It is a further object to provide such an apparatus including a tool driving magnetostrictive assembly and an exciting winding each supported on a base independently of the other, the winding being preferably annular and the magnetostrictive assembly being removably inserted within the winding and adjustable relative thereto.

It is a further object to provide an apparatus having a rotatable ultrasonically energized tool driving unit which is transversely adjustable relative to its axis of rotation for relative location of tool and axis as desired for machining operations.

It is a further object to provide an apparatus utilizing a tool oscillated at high or ultrasonic frequencies by a magnetostrictive driving unit rotatable relative to a stationary exciting winding energized by a high frequency electrical source, whereby superimposed oscillations and rotation are achieved with the minimum in rotating mass and without slip rings or other similar energy transmitting means between the rotating and stationary components of the ultrasonic driving means.

It is a further object to provide an apparatus having a carriage movable between corresponding positions relative to an optical sighting station and an ultrasonic machining station and mounting a work support through calibrated adjustment means, whereby the machining area can be optically inspected and precise dimensional relationships achieved between a reference sighting on the work and the actual machining area at the machining station.

It is a further object to provide an apparatus for high frequency machining utilizing a magnetostrictive driving unit formed of parallel magnetostrictive elements fixed at common ends to a motion transmitting member carrying and driving a tool, the elements having portions free for relative expansion and contraction and of differing effective relative lengths for resonance at different frequencies whereby optimum operating conditions of the unit are achieved within a range of exciting frequencies.

It is a further object to provide such an apparatus wherein the magnetostrictive segments are parallel, elongated magnetostrictive tubes of small diameter closely spaced, each of said tubes being fixed at one end to a motion transmitting member carrying and driving a forming tool, the other ends of said tubes being of an overall rounded configuration whereby resonance frequencies of the tubes vary from inner to outer radial positions in the assembly.

Figure 2:
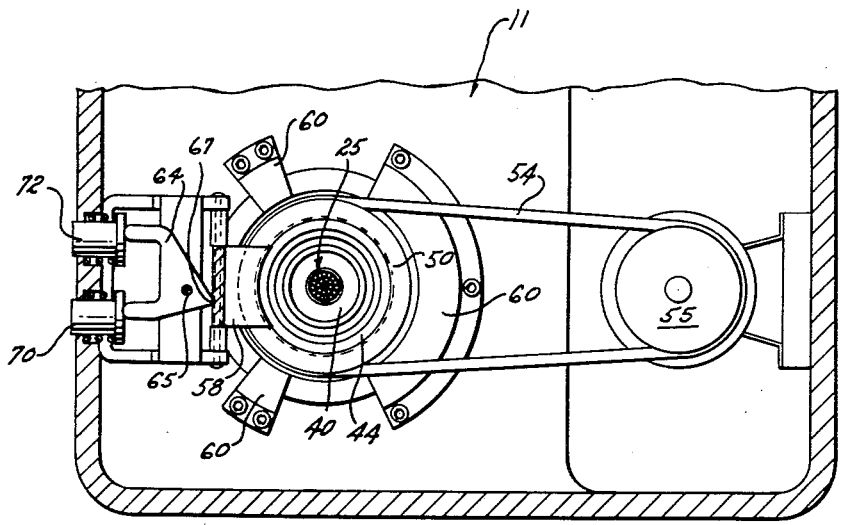
Figure 3:
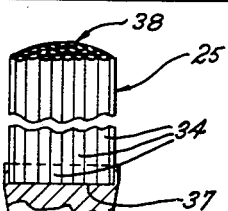
Figure 3:
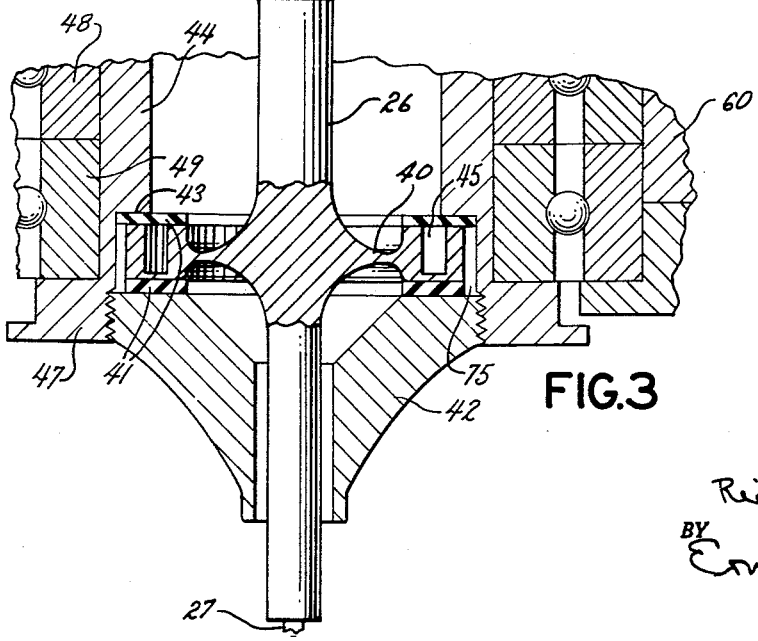
Figure 4:
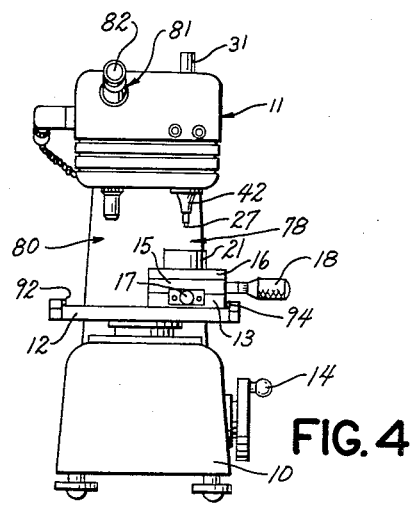
Figure 5:
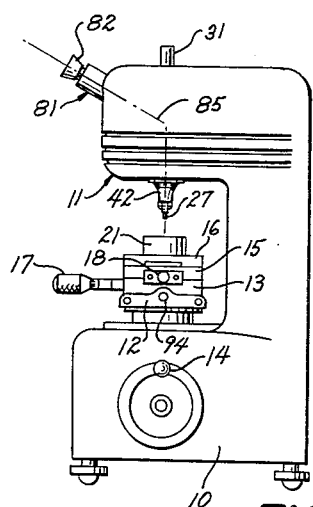

Other objects and advantages of the invention will be apparent from the following description, the appended claims, and the accompanying drawings, in which, FIGURE 1 illustrates an exemplary apparatus embodying the present invention, partially broken away to central vertical section, FIGURE 2 is a sectional view of the apparatus of FIGURE 1 taken on line 2—2 of FIGURE 1, FIGURE 3 is an enlarged illustration of a portion of the magnetostrictive driving assembly and its support, FIGURE 4 is a front view, in elevation, of the exemplary apparatus, and FIGURE 5 is a side view of the apparatus of FIGURE 4.

The present invention basically pertains to machining devices operative at extremely high frequencies of the general character shown and described in Balamuth Patent 2,580,716, issued January 1, 1952, wherein a magnetostrictive driver energized at high or ultrasonic frequencies by associated windings connected to a suitable generator oscillates a tool in association with a workpiece at an area flooded by an abrasive slurry.

In the present invention the exciting winding and magnetostrictive driving unit are independently supported and can be relatively moved and adjusted. As illustrated the magnetostrictive unit and a connected motion transmitting member for carrying a tool are rotated at high speed about the axis of oscillation and relative to the exciting windings. Thus superimposed rotation and oscillation are achieved in an apparatus wherein the minimum in rotating mass is provided and slip rings and other energy transmitting means are eliminated.

Provision is also made for shifting the tool axis relative to the axis of rotation to adjusted positions. This makes possible compensating adjustments in assembly and for machining results as desired with several advantageous results. For example, a hole can be machined which is larger than the tool itself by adjusting the tool to an eccentric position. If the tool is worn in diameter a compensating adjustment can be made. It makes it possible during assembly to place the tool exactly concentric on the axis of rotation if such is desired, thus compensating for manufacturing errors if they occur.

The magnetostrictive driving unit of this invention can be made up of magnetostrictive elements of different effective overall lengths so that they are resonant at different frequencies and optimum operating results obtained at any frequency within a range of exciting frequencies. Thus tuning adjustments and frequency stability of the exciting generator for the winding are not overly critical. These magnetostrictive elements are preferably small diameter elongated nickel tubes which are closely spaced, each fixed at one end to a tool carrying member but having portions free for relative expansion and contraction. The free ends of the tubes as illustrated are formed to an overall generally rounded configuration so that they are resonant at different frequencies depending upon their radial displacement from the axis of the unit.

The overall apparatus includes an optical sighting station located adjacent a machining station which includes the ultrasonic driving unit. The line of sight is parallel to the axis of rotation of the machine unit. A carriage mounted on the apparatus base is movable between corresponding positions at each of the stations and a work support is mounted on the carriage by micrometer adjustment means. Thus the machining area can be inspected at the inspection station. Reference sightings can be made on the work at the inspection station and through use of the micrometer adjustments machining can be achieved at desired positions relative to this sighting. Also if an area has been machined, the adjustments between the work support and carriage can be used to precisely position the work so that the second machining operation is at a desired disposition relative to the first.

Referring more particularly to the drawings, the exemplary apparatus illustrated includes a base 10 supporting a tool head 11 and a work carrying table 12.

Table 12 adjusted vertically by a crank 14 and conventional motion converting apparatus carries compound work supports 15 and 16 respectively adjustable at right angles on carriage 13 by micrometer knobs 17 and 18. Carriage 13 is movable on table 12 as later disclosed. A workpiece such as indicated at 20 is clamped in position within a retainer 21.

Tool head 11 includes a magnetostrictive driving assembly 24 made up of a magnetostrictive driving unit 25 and a motion converting member 26 supporting a tool 27. Member 26 is conformed in a manner known to those skilled in the art to obtain a desired conversion in amplitude of the movements of unit 25 to output movements of tool 27. Member 26 is made of a suitable material such as beryllium copper. An annular exciting winding 29 is fixedly mounted in tool head 11 at 28 independently of assembly 24. In the exemplary application illustration, a permanent magnet 30 is fixed in cap 31 to provide a magnetic bias on unit 25. This bias could be similarly provided by DC windings. The housing of tool head 11 is of a non-magnetic material.

Unit 25 is made up of a plurality of magnetostrictive elements which, as illustrated, are magnetostrictive tubes 34 of small diameter relatively insulated by a suitable thin coating and supported in parallel closely spaced relationship. These tubes terminate at their lower ends in a plane perpendicular to the axis of the magnetostrictive assembly 24 and are fixed, as by brazing, at their lower ends to converting member 26 at its upper surface 37. Tubes 34 are otherwise free for relative expansion and contraction. Thus each of the tubes 34 is in driving connection with motion converting member 26 and has at least a portion which is effectively operative independently of the other of said tubes.

As seen particularly in FIGURE 3, the upper ends of tubes 34 making up magnetostrictive unit 25 are rounded at 38 so that the tubes are of differing overall lengths at different radial displacements from the axis of assembly 24.

As previously mentioned, tubes 34 are preferably nickel. Such tubes provide high operating efficiency, are economically available in quantities, and are adaptable to air cooling. However, each tube has a critical or narrow resonance frequency. By providing different length tubes 34 in the same magnetostrictive unit 25 different tubes will resonate at different frequencies. Thus tubes 34 in unit 25 will have different resonant frequencies depending upon their radial displacement from the axis of assembly 24. Because of this, optimum driving conditions of the assembly can be achieved at differing frequencies within a narrow range of frequencies. Thus tuning adjustments and the frequency stability of the exciting generator for winding 29 are less critical than in previous devices of this character. This makes possible a simpler and much more economical generator circuit.

Motion converting member 26 has a supporting flange 40 at a nodal location therealong clamped by threaded retainer 42 to a downwardly facing surface 43 on sleeve 44 through interposed plastic washers 41. Annular goove 45 allows some vibratory radial expansion and contraction of motion converting member 26 at this location through flexing at the base of groove 45. This effectively isolates and prevents transmission of vibrations from driving assembly 24 to its supporting structure. Sleeve 44 has a lower shoulder 47 engaging the lowermost inner ring of a pair of ball bearings 48 and 49. Both inner rings as well as a driving pulley 52 are drawn into rigid engagement by a nut 50 threaded onto the upper end of sleeve 44 and through this cooperative arrangement carrying means are provided for the assembly. The outer rings of bearings 48 and 49 are clamped against the housing of tool head 11 by clamps 60 spaced thereabout. Drive means for rotation of assembly 24 includes a pulley belt 54 engaging pulley 52 driven by an electric motor 55 mounted within housing 11 to rotate magnetostrictive assembly 24 about the axis of oscillation of tool 27 at high speeds during a machining operation.

It will be noted that no slip rings or other mechanical energy transmitting structure is involved in the operation of the present apparatus as magnetostrictive unit 25 extends coaxially within winding 29 but is radially spaced for free rotation relative thereto.

Because it may be desirable to operate magnetostrictive assembly 24 without the superimposed rotation suitable stop means are provided. As illustrated a brake shoe 57 opposing the upper surface of nut 50 is provided on an elongated bell crank lever 58 biased in a counterclockwise direction as viewed in FIGURE 1 by spring 69. Lever 58 is operated to bring shoe 57 into braking engagement with nut 50, and to release it, by an operating link 64 pivoted at 65 and having an abutment 67 engaging the upper portion of lever 58.

When link 64 is rocked in a counterclockwise direction about pivot 65 by depression of button 70 shoe 57 is moved into braking engagement with nut 50. Because of the frictional engagement between abutment 67 and lever 58 it retains this position. Depression of button 72 operates link 64 in the opposite direction and shoe 57 is retracted to clear nut 50 by spring 69 previously mentioned.

As seen in FIGURE 3 flange 40 has oppositely facing mounting surfaces in planes transverse the axis of assembly 24. There is radial clearance between flange 40 and sleeve 44 as indicated at 75. Clamping structure is provided through the cooperation of threaded retainer 42 and sleeve 44. As retainer 42 is screwed into sleeve 44 flange 40 of member 26 is clamped in position. Clearance 75, and the clearance between unit 25 and winding 29, allows radial adjustment of the driving assembly 24 relative to bearings 48 and 49 and the axis of rotation. In assembly this permits adjustment so that, if desired, the axis of member 26 is precisely concentric with the axis of rotation. Similarly it allows deliberate eccentricity between tool 27 and the axis of rotation if expedient for different applications. For example this would make it possible to machine a hole of a larger diameter than the tool through an eccentric rotation of the tool as it is ultrasonically driven. Tools 27 are often brazed to member 26. Through the sidewise adjustment provided these tools can be brought precisely concentric with the axis of rotation—providing compensation for any errors in mounting and making this operation less critical. Compensation is possible for radial tool wear by shifting the assembly and clamping it eccentric to the axis of rotation by the necessary amount. Also, as a further example, an eccentrically mounted hollow tool can be used to form a projection on the work which is smaller than the hole in the tool.

During operation the operating area of workpiece 20 is covered by an abrasive slurry or paste as tool 57 is oscillated axialy at ultrasonic frequencies. When rotation is desired magnetostrictive assembly 24 is simultaneously rotated about the axis of vibration at high speeds through motor 55 and pulley belt 54. Feeding movement of workpiece 20 is provided in this embodiment through movement of crank 14 which elevates supporting table 12. As machining progresses crank 14 is rotated to gradually raise workpiece 20. If desired retainer 21 can be mounted on support 16 for vertical yielding so the work is resiliently fed to the tool.

As seen in FIGURES 4 and 5 tool head 11 is included in a machining station 78 on base 10. Base 10 also supports an inspection station 80 which includes magnifying optical sight means 81. Sight means 81 includes an eyepiece 82 providing a vertical line of sight 85 with sighting crosshairs in a conventional manner. The line of sight of optical sight means 81 in inspection station 80 is parallel to the axis of assembly 24 in machining station 78. Carriage 13 is guided on mounting table 12 for movement between corresponding positions at inspection station 80 and machining station 78. Adjustable stops 92 and 94 insure that carriage 13 is identically positioned relative to line of sight 85 when at the inspection station and relative to the axis of rotation of tool head 11 when at the machining station.

Micrometer adjustments 17 and 18 allow precise adjustments of the work relative to carriage 13. This is extremely useful in conjunction with sighting means 81. For example, with carriage 13 at the inspection station 80, by sighting through eyepiece 82 and using the micrometers' adjustments a reference sighting can be obtained on the work or supporting fixture. Then when carriage support 15 is moved to machining station 78 against stop 94, without further adjustment, the identical area will be machined. If desired, through micrometers' adjustments 17 and 18, the machining can be accomplished at any precise position on the work relative to the sighting at the inspection station. Through the micrometer adjustments alone any series of areas can be machined at precise locations relative to one another. Of course inspection station 80 allows microscopic examination of the work.

Thus it is seen that an apparatus has been provided wherein a tool driving magnetostrictive assembly and its associated winding are independently supported on a base so that relative movement and adjustment are possible as desired. Superimposed ultrasonic vibrations and high speed rotations of a tool are achieved in an assembly avoiding the use of slip rings or other mechanical energy transmitting structure. Through the unique configuration of the magnetostrictive driving means of this invention the overall assembly is materially simplified for economical manufacture and less complex and expensive generator equipment can be utilized.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An apparatus for machining by high frequency oscillations comprising a base, a magnetostrictive driving assembly including a magnetostrictive driving unit and a motion transmitting member fixed to one end of said unit for supporting and driving a forming tool, means cooperating between said base and said member forming the sole support for said assembly and mounting said assembly for rotation on said base, an exciting winding for said unit connectable to a source of electrical energy of high frequency, and means mounting said winding on said base independent of said assembly and in close proximity but with clearance relative to said magnetostrictive unit.

2. An apparatus for machining by high frequency oscillations comprising a base, a driving assembly including an ultrasonic driving unit for supporting and driving a forming tool at high frequencies and minute amplitudes, carrying means on said base supporting said unit for rotation about an axis parallel to the axis of oscillation, said carrying means including adjustable means providing for relative transverse adjustment between the axis of oscillation and the axis of rotation for radial positioning of said tool relative to the axis of rotation for operations as desired, and drive means operatively connected to rotate said unit on said base for simultaneous rotation and high frequency oscillation of said tool during machining.

3. An apparatus for machining by high frequency oscillations comprising a base, a magnetostrictive driving assembly including a magnetostrictive driving unit and a motion transmitting member fixed to one end of said unit for supporting and driving a forming tool, bearing means on said base for rotatably supporting said assembly, adjustable carrying means cooperating between said bearing means and said assembly for adjustably positioning the assembly relative to the bearing means transverse the axis of rotation, an annular exciting winding for said unit connectable to a source of electrical energy of high frequency, and means mounting said winding on said base independent of said assembly and coaxially about but with clearance relative to said magnetostrictive unit, whereby said unit can be inserted into and removed from said winding and rotated relative to said winding and said base, and drive means operatively connected to said assembly to rotate said unit relative to said winding during excitation thereof for simultaneous rotation and high frequency oscillation of said member during machining.

4. An apparatus for machining by high frequency oscillations comprising a base, a magnetostrictive driving assembly including a magnetostrictive driving unit and a motion transmitting member fixed to one end of said unit for supporting and driving a forming tool, bearing means cooperating between said base and said member supporting said assembly on said base for rotation, an annular exciting winding for said unit connectable to a source of electrical energy of high frequency, and means mounting said winding on said base independent of said assembly and coaxially about but with clearance relative to said magnetostrictive unit, whereby said unit can be inserted into and removed from said winding and rotated relative to said winding and said base.

5. An apparatus for machining by high frequency oscillations of a forming tool comprising a base, a magnetostrictive driving assembly including a magnetostrictive unit and a motion transmitting member fixed to one end of said unit for supporting and driving a forming tool, an exciting winding for said unit connectable to a source of electrical energy of high frequency, bearing means rotatably mounting said driving assembly on said base, means independently mounting said winding on said base in close proximity to said magnetostrictive unit, and drive means operatively connected to said assembly to rotate said unit relative to said winding during excitation thereof for simultaneous rotation and high frequency oscillation of said member during machining.

6. An apparatus for machining by high frequency oscillations of a forming tool comprising a base, a magnetostrictive driving assembly including a magnetostrictive unit and a motion transmitting member fixed to and extending axially from said unit, means on said member for supporting and driving a forming tool, an annular exciting winding for said unit for connection to a source of electrical energy of high frequency, means mounting said winding on said base independent of said assembly, bearing means cooperating between said assembly and said base supporting said unit for rotation coaxially within said winding during excitation thereof, and drive means operatively connected to rotate said assembly, whereby said unit and said member are simultaneously rotated and oscillated at high frequencies during a machining operation.

7. An apparatus for machining by high frequency oscillations comprising a base, a driving assembly including an ultrasonic driving unit for supporting and driving a forming tool longitudinally at high frequencies and small amplitudes, said unit having a supporting flange providing oppositely facing mounting surfaces transverse the axis of oscillation, bearing means on said base including clamp means for engagement with said surfaces and rotatably supporting said unit, energizing means for said unit connectable to a source of electrical energy of high frequency, said supporting flange having radial clearance relative to said clamp means when said unit is coaxial to the bearing axis, whereby the unit can be adjustably positioned transverse the axis of rotation and clamped in position for rotation.

8. An apparatus for machining by high frequency oscillations comprising a base, a magnetostrictive driving assembly including a magnetostrictive driving unit and a motion transmitting member fixed to one end of said unit for supporting and driving a forming tool, said assembly having a supporting flange providing oppositely facing mounting surfaces transverse the assembly axis, bearing means on said base including clamp means for engagement with said surfaces and rotatably supporting said assembly, an annular exciting winding for said unit connectable to a source of electrical energy of high frequency, means mounting said winding on said base independent of said assembly and coaxially about but with clearance relative to said magnetostrictive unit, said supporting flange having radial clearance relative to said clamp means when said assembly is coaxial to the bearing axis, whereby the assembly can be adjustably positioned transverse the axis of rotation and clamped in position for rotation.

9. An apparatus for machining by high frequency oscillations comprising a base, a driving assembly including an ultrasonic driving unit for supporting and driving a forming tool longitudinally at high frequencies and small amplitudes, said unit having a supporting flange providing oppositely facing mounting surfaces transverse the axis of oscillation, bearing means including an outer member fixed on said base and an inner member rotatably carried thereby, said inner member having a longitudinal passage therethrough coincident with the axis of rotation providing a flange receiving shoulder and a threaded portion relatively spaced therealong, said driving unit being mounted coaxially within said passage by engagement of one of said mounting surfaces against said shoulder, a clamping nut threaded into said passage having an opening therethrough for receiving said unit and including a clamping surface for engagement with the opposite supporting surface of said unit, said flange having radial clearance relative to said inner member whereby the unit is adjustably positioned transverse the axis of rotation and clamped in position for operation, electrical energizing means for driving said unit and obtaining longitudinal oscillations of said tool at high amplitudes, and driving means connected for rotation of said inner member and the unit carried thereby, whereby superimposed high frequency oscillations and rotation of the forming tool are obtained.

10. An apparatus for machining by high frequency oscillations of a forming tool comprising a base, a machining device on said base including an ultrasonic machining unit having means for driving a tool at high frequencies and minute amplitudes, an inspection device on said base adjacent said machining unit including optical sight means, a carriage guided on said base for movement between positions at each of said devices, stop means for locating said carriage in corresponding positions relative to the machining unit and sight means at the respective devices, a work support, and calibrated adjustment means mounting said work support on said carriage whereby the machining area can be readily inspected and precise dimensional relationships obtained between a reference sighting on the work and the actual machining area at the machining device.

11. An apparatus for machining by high frequency oscillations of a forming tool comprising a base, a machining device on said base including a magnetostrictive tool driving unit, means supporting and driving said unit for rotation about a vertical axis including means for adjustably positioning said unit transverse said axis, an exciting electrical winding for said unit fixedly mounted on said base and with clearance relative to the unit, an inspection device on said base adjacent said machining device including optical sight means having a line of sight parallel to the axis of rotation of said magnetostrictive unit, a carriage guided on said base for movement between positions at each of said devices, a work support, calibrated adjustment means mounting said work support on said carriage, and stop means on said base for locating said carriage in corresponding positions relative to the respective devices, whereby identical points on a workpiece are intersected by said line of sight and axis of rotation upon movement of said work support between the devices, and precise work locating adjustments may be achieved through use of said calibrated adjustment means.

12. An apparatus for machining by high frequency oscillations of a forming tool comprising a magnetostrictive driving unit including a plurality of elongated magnetostrictive elements, a motion transmitting member for supporting and driving a tool affixed thereto, means fixing said elements to said member and disposing said elements in closely spaced parallel relationship, said elements having portions free for relative elongation and contraction and said elements having different overall lengths, and an exciting winding for said unit for connection to a source of electrical energy of high frequency in close proximity to said unit, whereby said elements resonate at different exciting frequencies for a broadened range of resonant frequencies of said unit.

13. An apparatus for machining by high frequency oscillations of a forming tool comprising a magnetostrictive driving assembly including a magnetostrictive unit and a motion transmitting member for supporting and driving a tool affixed thereto, said unit comprising a plurality of elongated magnetostrictive tubes of small diameter, means fixing said tubes to one end of said transmitting member in closely spaced parallel relationship, said tubes being otherwise free for relative endwise expansion and contraction, and an annular exciting winding supported in coaxial spaced relationship about said unit for connection to a source of electrical energy of high frequency.

14. An apparatus for machining by high frequency oscillations of a forming tool comprising a base, a magnetostrictive driving assembly including a magnetostrictive unit and a motion transmitting member for supporting and driving a tool affixed thereto, an exciting winding for said unit for connection to a source of electrical energy of high frequency, said unit comprising a plurality of elongated magnetostrictive tubes of small diameter, and means fixing one end of each of said tubes to said motion transmitting member and disposing said tubes in closely spaced parallel relationship for free relative endwise expansion and contraction, said tubes being of different effective overall lengths for resonance at different exciting frequencies, whereby said unit has a broadened range of resonant frequencies.

15. An apparatus as set forth in claim 14 wherein the ends of said tubes affixed to said motion transmitting member are terminated in a common plane transverse the driving assembly, the other ends of said plurality of tubes being of an overall rounded configuration whereby tubes at different radial displacements from the axis of said unit have different resonance frequencies.

16. An apparatus for machining by high frequency oscillations of a forming tool comprising a base, a magnetostrictive driving assembly including a magnetostrictive unit formed by a plurality of elongated parallel magnetostrictive elements and a motion transmitting member fixed to one end of each of said elements for supporting and driving a tool carried by the member, an exciting winding for said unit for connection to a source of electrical energy of high frequency, at least portions of said elements being relatively separate for independent endwise expansion and contraction and of differing overall lengths for resonance at different excitation frequencies, means rotatably mounting said driving assembly on said base, means mounting said winding on said base in operative association with said magnetostrictive unit, and driving means operatively connected to said assembly to rotate said unit relative to said winding during the excitation thereof for simultaneous rotation and high frequency oscillations of said member and a tool supported thereby during machining.

17. An apparatus for machining by high frequency oscillations of a forming tool comprising a base, a magnetostrictive driving assembly including a magnetostrictive unit formed by a plurality of elongated magnetostrictive tubes of small diameter closely spaced in parallel relationship and a motion transmitting member fixed to one end of each of said tubes for supporting and driving a forming tool, said tubes being otherwise free for relative elongation and contraction, an exciting winding for said unit for connection to a source of electrical energy of high frequency to provide high frequency elongations and contractions of said magnetostrictive tubes, means rotatably mounting said driving assembly on said base, means mounting said winding on said base independently of said assembly and its mounting means and drive means operatively connected to rotate said assembly relative to said winding during excitation thereof for simultaneous rotation and high frequency oscillation of said member during machining.

18. An apparatus for machining by high frequency oscillations of a forming tool comprising a base, a magnetostrictive driving assembly including a plurality of elongated magnetostrictive tubes of small diameter closely arranged in parallel relationship to form a driving unit, said tubes terminating at one end in a plane transverse the unit, a motion transmitting member in said assembly fixed to each of said tubes at said one end thereof for supporting and driving a forming tool, said tubes being free for relative endwise expansion and contraction and terminating at the other ends thereof in a generally overall rounded configuration whereby tubes at different displacements from the axis of said assembly have different resonance frequencies, means mounting said assembly on said base for rotation, an annular exciting winding for said tubes, means fixing said exciting winding on said base coaxially with said driving unit and spaced radially therefrom, and drive means operatively connected to said assembly to rotate said unit within said annular winding during excitation thereof for simultaneous rotation and high frequency oscillation of said member during machining.

References Cited in the file of this patent
UNITED STATES PATENTS

| | | |
|---|---|---|
| 2,197,308 | Kolb | Apr. 16, 1940 |
| 2,446,575 | Cooke | Aug. 10, 1948 |
| 2,580,716 | Balamuth | Jan. 1, 1952 |
| 2,804,725 | Dench | Sept. 3, 1957 |
| 2,806,328 | Bradfield | Sept. 17, 1957 |
| 2,818,686 | Weiss | Jan. 7, 1958 |